Figure 1:
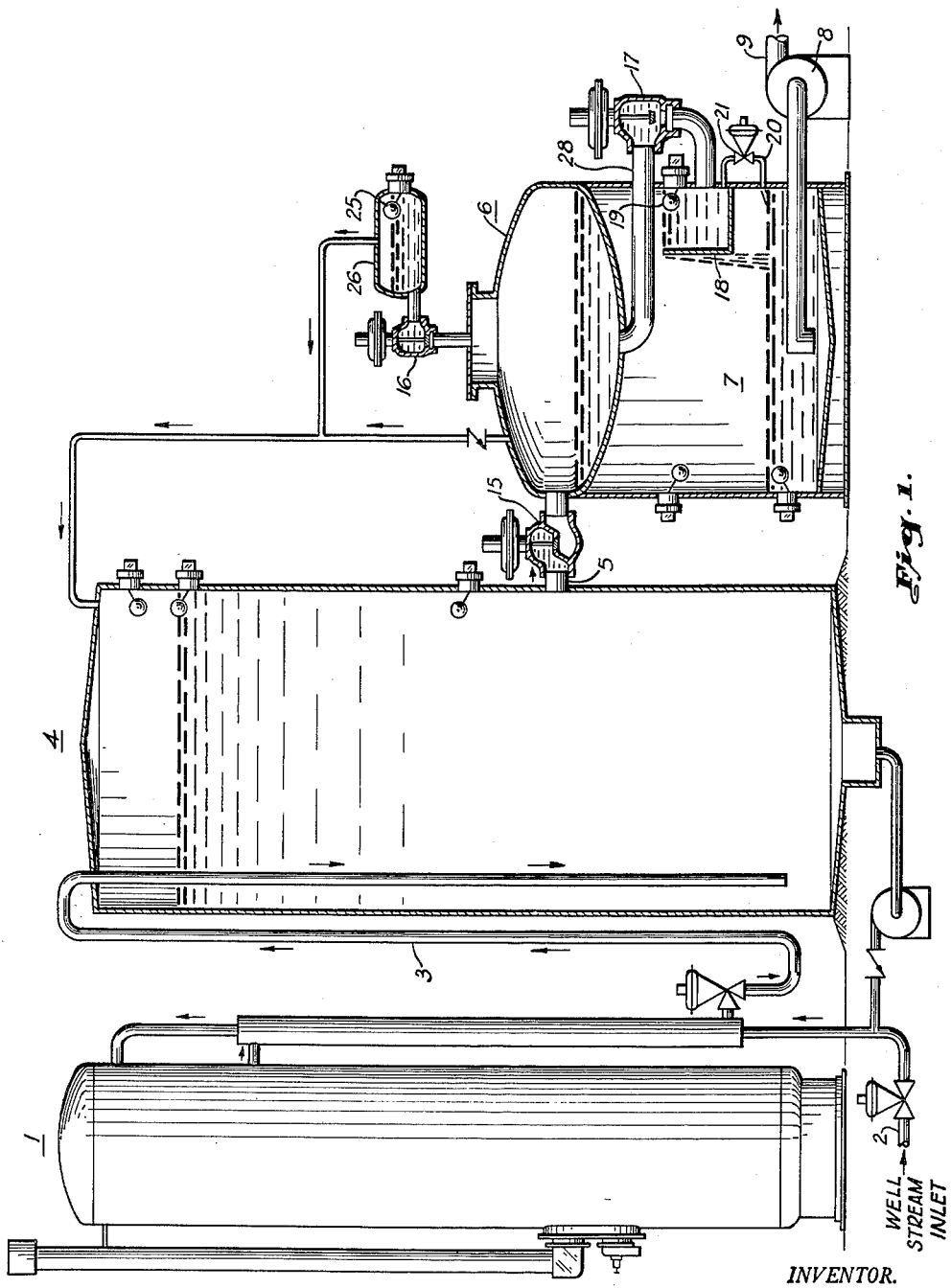

INVENTOR.
WILLIAM R. WILLIS

March 19, 1963  W. R. WILLIS  3,081,630
METERING SYSTEM
Filed July 30, 1959  3 Sheets-Sheet 2

INVENTOR.
WILLIAM R. WILLIS
BY Arthur L. Wade
ATTORNEY

March 19, 1963 W. R. WILLIS 3,081,630
METERING SYSTEM
Filed July 30, 1959 3 Sheets-Sheet 3

INVENTOR.
WILLIAM R. WILLIS
BY Arthur L Wade
ATTORNEY

United States Patent Office 3,081,630
Patented Mar. 19, 1963

3,081,630
METERING SYSTEM
William R. Willis, Tulsa, Okla., assignor to National
Tank Company, Tulsa, Okla., a corporation of Nevada
Filed July 30, 1959, Ser. No. 830,621
8 Claims. (Cl. 73—224)

The present invention relates to a metering system in which a vessel is cycled through a filling and emptying period as a complete cycle. More particularly, the invention relates to control of a bottom valve for the emptying, or dumping, of such a metering vessel and the system in which the valve is included.

Positive-volume metering between an upper valve and a lower valve of a metering vessel has been developed to obtain consistent gross volume units of metered liquid. United States application SN 586,968, filed May 24, 1956, by William A. Pitts discloses systems including such a combination.

With the valve in the discharge conduit of the measuring tank closed, the tank above the discharge valve is supplied with liquid during the filling period of each cycle. When the liquid level rises above, floods the upper valve, the upper valve is closed to establish the measured unit of gross volume of liquid, captured positively within the tank and between the upper and lower valves. The lower, discharge, valve is then opened, and the unit of liquid counted and delivered to the purchaser, or consumer, of the liquid. Integration of the number of these dumps, through the discharge valve, becomes a metering of the delivered liquid. This integration can be compensated to a net value by compensating structure responsive to variables of the volume such as temperature, specific gravity, etc.

The system of metering across a bottom valve has two problems. With a float chamber downstream of the bottom valve, to develop a signal representative of the end of each cycle of filling and dumping, the major portion of the liquid will pass through the float chamber and permit the float to drop while a finite amount of clingage remains on the walls of the metering vessel. If the float signal developed from the drop closes the bottom valve, an indefinite amount of clingage is trapped above the valve and included in the next vessel of liquid metered.

The second problem arises when power to the control system fails. Assume the bottom valve fails-shut. With the bottom valve closed, the float chamber downstream empties and the float falls as though the cycle were completed. But if the power failed during the filling period, the cycle would not be completed. When power is regained, the fallen float immediately signals a termination of the complete cycle, and the next filling period is initiated while undumped liquid remains in the measuring vessel. Further, the fallen float, as an index of cycle completion, initiates a full count on the integrator, although a full dump of the metering vessel has actually not been made.

A principal object of the present invention, in a metering system utilizing a vessel cycled through a filling period and a dumping period and valved from its bottom, is to prevent the development of a signal representative of the cycle completion until clingage in the vessel has been reduced an acceptable amount.

Another object of the invention, in the metering system described, is to prevent the development of a closing signal for the bottom valve until clingage in the vessel has been reduced an acceptable amount.

Another object, in a metering system utilizing a bottom-valved vessel with a float downstream of the valve to index completion of the cycle of filling and dumping, is to prevent the float from falling, as the completion index, until clingage in the vessel has been reduced an acceptable amount.

Another object, in the metering system described, is to maintain a reservoir of the metered liquid in the chamber of the float to prevent the float from falling, as the completion index, until clingage in the vessel has been reduced an acceptable amount.

Another object, in a metering system employing a bottom-valved vessel with a float downstream of the valve and developing the end-of-the-cycle signal which is employed to shut the bottom valve and actuate an integrator of the vessel dumps, is to prevent development of the signal until the vessel has been completely dumped in each metering cycle.

Another object, in the metering system described, is to prevent development of the signal until the vessel has been completely dumped in each metering cycle should a power failure cause the bottom valve to close during a dumping period.

The present invention contemplates a metering system including a vessel valved from its bottom and controlled to receive liquid from a source of liquid to be metered, in a filling period, and to deliver liquid to a point of use, in a dumping period. A float is mounted in the discharge conduit downstream of the bottom valve. A reservoir of the dumped liquid is retained to buoy the float for a period of time determined to insure clingage will pass the valve until there is not enough clinkage remaining in the vessel to exceed predetermined limits of metering accuracy.

The invention further contemplates the reservoir formed by a chamber in which a dam member gives the reservoir a fixed capacity. A drain line for the reservoir is then provided to lower the liquid level of the reservoir until the float drops to index the cycle completion in the time predetermined to reduce the clingage to the predetermined limits.

The invention further contemplates a valve in the drain line opened enough to give the desired drain flow rate.

The invention further contemplates the control system for the bottom valve arranged to close the valve in the drain line when a power failure for the bottom valve causes closure of the bottom valve during the dumping period.

The invention further contemplates an integrator responding to the index signal of cycle completion initiated by the float. The integrator, cumulating the cycle completions as the total amount of liquid delivered to a point of use, is not actuated when power fail-shuts the bottom valve because the float is trapped into buoyancy by closure of the drain valve.

Figure 2:
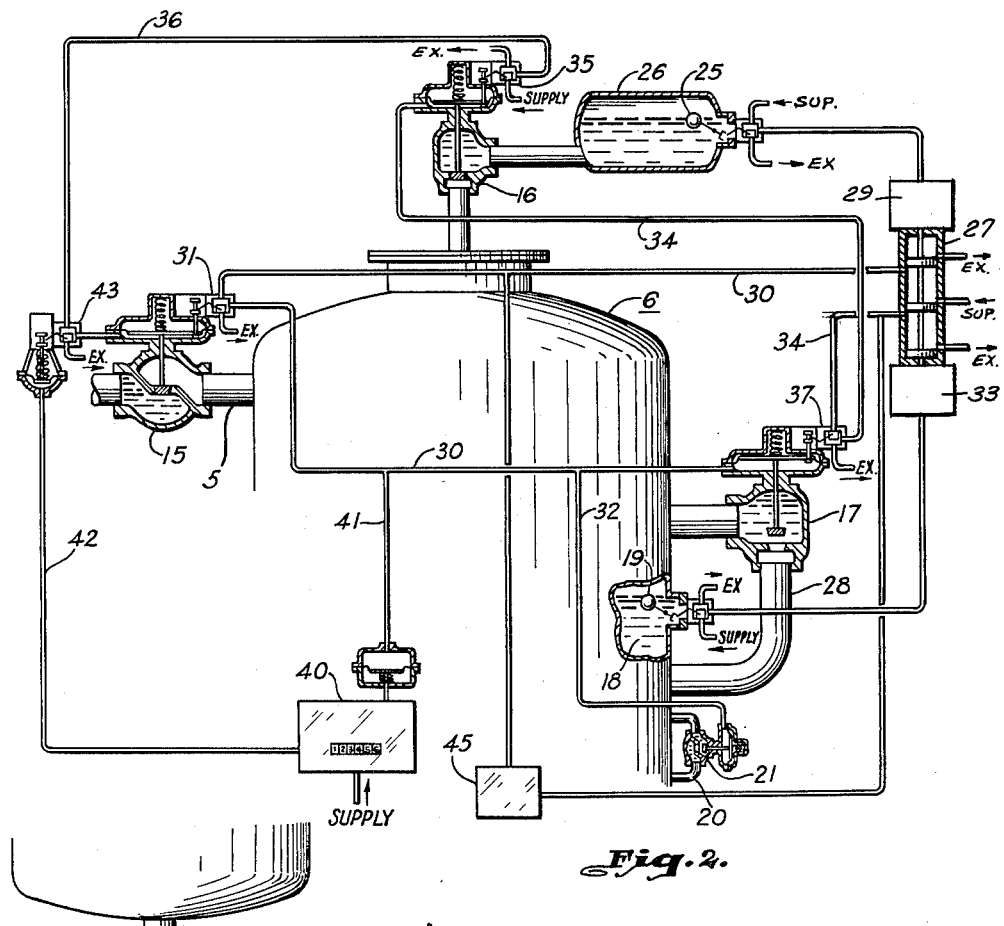
Figure 3:
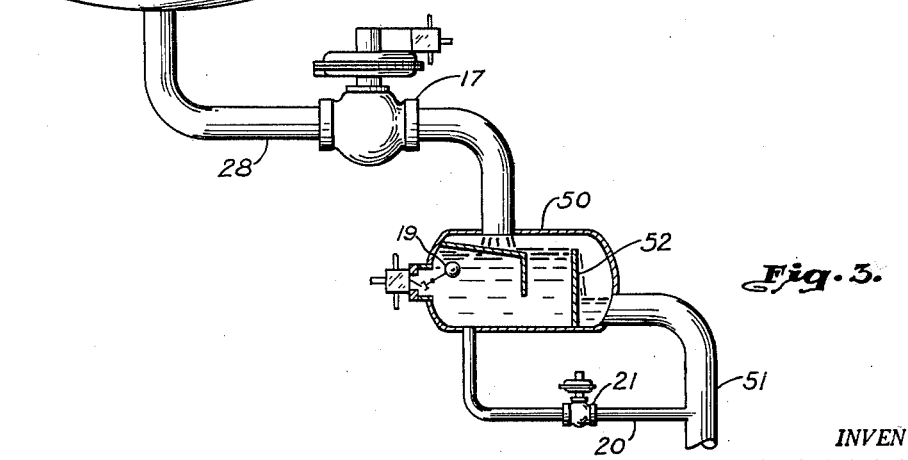
Figure 2A:
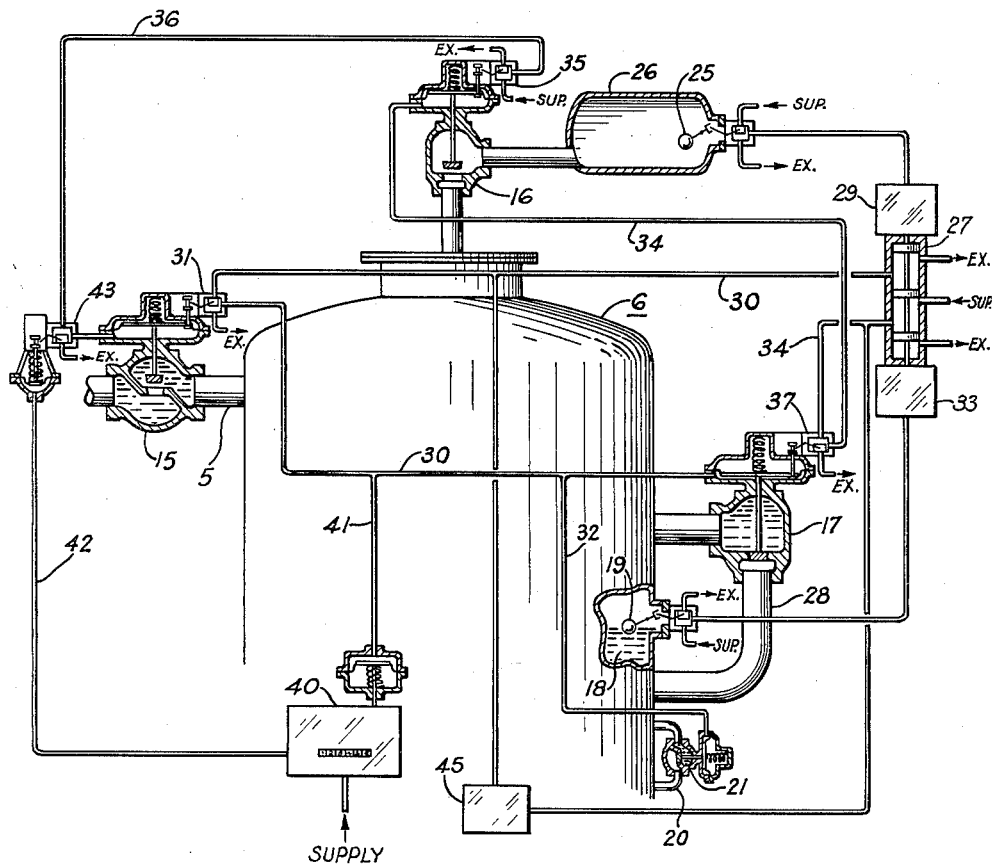

Other objects, advantages and features of this invention will become apparent to one skilled in the art upon consideration of the written specification, appended claims, and attached drawings wherein;

FIG. 1 is a somewhat diagrammatic illustration of a complete automatic custody transfer system in which the invention is embodied, FIG. 2 is a portion of the structure of FIG. 1 in which the control system is also illustrated dumping the meter tank, FIG. 2A in the structure of FIG. 2 positioned to fill the meter tank, and FIG. 3 is a diagrammatic illustration of another form for the float chamber of the metering system.

LEASE AUTOMATIC CUSTODY TRANSFER SYSTEM

Referring to FIG. 1, in order to fully develop the utility of the present invention, a complete system of lease automatic custody transfer is illustrated. The disclosure of FIG. 1 illustrates the well stream as directed through conventional treating facilities where the oil, gas and water are separated into individual components. Clean oil is deposited in a working tank. From the working tank, the clean oil is taken through a custody meter, a pipeline surge tank and then into the pipeline as a delivered product.

The well stream is brought into treater 1 with conduit 2. Clean oil produced by treater 1 is taken by conduit 3 into working tank 4. Conduit 5 directs the clean oil of tank 4 into custody meter 6. Filling and dumping of meter 6 delivers the clean oil into pipeline surge tank 7. From surge tank 7, pump 8 removes the clean oil through conduit 9 for delivery to a pipeline.

Various control systems have been developed for portions of the system disclosed in FIG. 1. A system for drawing oil from the bottom of working tank 4 may recirculate this liquid through treater 1 by inserting it into conduit 2. A system for recovering evolving vapors collected in the top of working tank 4 has been developed.

Production into treater 1, from the lease, is controlled by a valve in conduit 2. The output of treater 1, into conduit 3 is controlled by a valve in that conduit. The level of treated oil deposited in working tank 4 may be controlled between predetermined values. Floats are indicated with which control impulses can be developed for the level control in this tank 4. The percent bottom sediment and water in the oil of working tank 4, drawn off with conduit 5, can be detected and the recirculation pump controlled by the detecting monitor. These, and other control systems, are important to the over-all operation of the lease automatic custody transfer system disclosed in FIG. 1. However, the present invention can be adequately disclosed with only this general reference to such features.

The present invention is closely associated with the metering system controlling custody meter 6. As used in the system of FIG. 1, meter 6 is operated through filling and emptying periods which comprise a complete cycle. Three valves are controlled to basically operate the meter. Fill valve 15, in conduit 5, controls the introduction of oil to be metered from working tank 4 into custody meter 6. Topping valve 16 is kept open during the filling period of the cycle until the valve is flooded. When the flooding of valve 16 is detected, both fill valve 15 and topping valve 16 are closed. The exact, positive volume of the custody meter 6 is then isolated between the seats of fill valve 15, topping valve 16 and bottom valve 17. The lower discharge valve 17 is then opened, and the unit of liquid counted and delivered to pipeline surge tank 7. Essential elements of the present invention are embodied in apparatus between the custody meter 6 and pipeline surge tank 7.

PROBLEMS

The two basic problems are solved by the present invention. The problems are created by controlling the custody meter 6 from bottom valve 17, with a sensing means downstream of the bottom valve to develop the signal representative of the end of each cycle of a filling period and a dumping period. More specifically, a reservoir, or volume chamber, with a float therein represents one of many possible primary elements for responding to the major portion of the liquid which passes through the float chamber downstream of bottom valve 17. It can be readily appreciated that if reservoir chamber 18 passes the dumped liquid of valve 17 through it at substantially the same rate it receives dumped liquid, float 19 will develop a signal for the control system of valve 17 as soon as the major portion of oil from meter 6 passes valve 17 and through float chamber 18. Float 19 will then drop and signal valve 17 to close while a finite amount of clingage remains on the walls of the metering vessel 6.

With temperature, specific gravity, paraffin content and other variables varying clingage in meter 6, the dropping of float 19, as soon as the major portion of the metered oil passes through reservoir 18, will cause retention of an indefinite amount of clingage above bottom valve 17. Counting of the full cycles of the metering system will give an inaccurate measure of the gross volume of liquid passing through the meter.

The second problem is related to the first. Should the general power supplied to the metering system fail during the dumping period of the cycle, bottom valve 17 will close. If reservoir-float chamber 18 drains at substantially the same rate it fills, float 19 will drop and the control system index and count completion of the metering cycle. Not only will the partially emptied volume of custody meter 6 be counted as a completely delivered and measured unit of oil, but the signal developed by float 19, when the general power of the system is regained, will initiate the filling period of the next cycle with undumped oil remaining in custody meter 6. Obviously, both of these problems seriously threaten accuracy of the entire lease automatic custody transfer system.

GENERAL SOLUTION

To carry out objects of the present invention, reservoir-float chamber 18 is provided means for retaining enough of the dumped liquid beneath float 19 to keep it and not permit development of a signal representative of the cycle completion under both conditions described. In order to retain this dumped liquid, drain line 20 is communicated with the bottom of reservoir 18 and the rate of drain through line 20 is established by the capacity of valve 21.

To further carry out objects of the invention, a control system is then provided to operate the structure of FIG. 1 so that valve 21 will be opened to retain the buoying liquid under float 19 for the period of time determined to insure a desired amount of clingage will pass bottom valve 17. Further, valve 21 is arranged to respond to the control system so that if a general power failure causes bottom valve 17 to fail-shut, valve 21 will simultaneously close. Closure of valve 21 during the period of dumping custody meter 6 will trap enough dumped liquid in reservoir 18 to maintain float 19 buoyed and prevent development of the end-of-the-cycle signal. As float 19 is not permitted to drop, the integrator of the number of custody meter dumps will not be actuated, and the resumption of power on the control system will result in the metering being continued under the conditions which existed when the power failure occurred.

CONTROL SYSTEM

Referring now to FIGS. 2 and 2A, custody meter 6 is shown on a larger scale than in FIG. 1 and the essential elements of the control system to carry out its cycles of operation is illustrated. The control system of FIGS. 2 and 2A is shown developing its specific power impulses from an available fluid pressure supply. However, an electric control system for accomplishing the same results is obviously feasible.

The fluid pressure supply is normally expected to be a single source. However, to reduce the complication of illustrating complex piping from a single source, individual indications of supply are shown at each component of the system. This convention is used with the understanding that the supply could be from an air compressor, or vapor from the separator or treater, suitably filtered and regulated to a desired range of pressure.

The primary elements which develop the control impulses for the control system are bottom float 19 and top float 25. These floats are representative of means which can develop control signals representative of the levels of liquid in chamber 18 and chamber 26. When liquid is sensed in chamber 26, topping valve 16 is flooded, i.e. liquid has risen above it. When the liquid level of chamber 18 falls low enough to lower float 19, the cycle of a filling period and a dumping period has been completed.

The four-way switching pilot valve 27 centralizes the action of the control system. Supplied from the source of fluid pressure, pilot valve 27 alternately opens dump valve 17 while closing topping valve 16 under the direction of floats 19 and 25. Topping valve 16 establishes a fluid pressure control impulse to open fill valve 15 when topping valve 16 is opened and to close fill valve 15 when topping valve 16 is closed. Therefore, topping valve 16 and fill valve 15 are opened and closed together and alternately with dump valve 17.

*Basic Metering Function*

The basic sequence of operation can be readily followed from FIGS. 2 and 2A. Bottom valve 17 is shown open, dumping the contents of meter 6 through conduit 28, reservoir 18 and into pipeline surge tank 7. Float 25 is shown up, having developed the fluid pressure control impulse to apply to actuator 29 with which pilot valve 27 had been shifted to connect pipe 30 to supply.

Pipe 30 is communicated to dump valve 17 to open the valve, as shown. Note is made of the routing of pipe 30 through interlock valve 31 on fill valve 15. Because of interlock valve 31, dump valve 17 can only be opened when fill valve 15, and topping valve 16, are both closed. Pipe 32 branches from pipe 30 to open valve 21 from the pipe 30 impulse.

Float 19 is shown up, the dumped liquid overflowing reservoir 18 in buoying float 19. The dumped liquid is also draining through conduit 20, valve 21 having been opened by the impulse of pipe 30. As the major portion of dumped liquid is drained from meter tank 6, through valve 17 and through reservoir 18, the portion retained by reservoir 18 will drain through conduit 20 and valve 21, to lower float 19, in a time established by the capacity of conduit 20 and valve 21. This time is fixed to drain the clingage of meter 6 down to an amount which will not reduce the accuracy of the meter below predetermined limits.

When float 19 finally does lower as shown in FIG. 2A, it develops a fluid pressure control impulse from the supply pressure, representative of the cycle completion. This signal is applied to actuator 33, shifting the stem of valve 27 to connect pipe 34 to supply pressure and exhausting pipe 30 to close both valve 17 and valve 21. Valve 16 is opened by the control impulse in pipe 34 and actuates valve 35 to develop a control impulse in pipe 36 which opens fill valve 15 simultaneously.

The meter 6 then goes into its filling period as shown in FIG. 2A. Note that interlock valve 37 in pipe 34 is controlled by dump valve 17 so topping valve 16 and fill valve 15 can both be opened by the pressure developed in pipe 34 only when dump valve 17 is closed.

A commercially available switching pilot valve mechanism which will function as required for pilot valve 27 is manufactured by Garrett Oil Tools, Division U.S. Industries, Incorporated, Longview, Texas, and designated as a Type "E" shuttle valve. The valving between supply pressure, exhaust, pipe 30 and pipe 34 is disclosed diagramaticaly, actuated between its two positions by actuators 29 and 33. Actuator 29 responds to the upper float 25 fluid pressure control impulse, and actuator 33 responds to the lower float fluid pressure control impulse 19. Each actuator is spring-returned from actuating the shuttled valve stem. Further, the valve stem may be shuttled with the control impulse of one actuator whether or not the other control impulse has been removed from the other actuator.

After topping valve 16 is opened by the fluid pressure in pipe 34, the liquid in chamber 26 drains into meter 6. Float 25 lowers and the fluid pressure control impulse is removed from actuator 29. Actuator 29 resets under the force of a spring, ready to shift the stem of valve 27 when another control impulse is received from float 25. When float 25 raises, the stem is shifted in valve 27 to the FIG. 2 position and the dumping period begins.

*Allowable Counter*

This control system is easily adapted to include a counter responsive to the number of cycles. When production is limited, for conservation or other reasons, the counter can prevent the fill valve 15 from opening. The system will then be shut down until manually released to continue its metering.

Specifically, allowable counter 40 is shown impulsed from pipe 30 by branch pipe 41. After a predetermined number of impulses, i.e. cycles of meter 6, counter 40 establishes an impulse in pipe 42. Pipe 42 actuates blocking valve 43, in pipe 36. The impulse of pipe 36 is thereby isolated from fill valve 15 until counter 40 is manually reset.

*Net Barrel Counter*

An integrator of the cycles of meter 6 is illustrated at 45. This integrator can take the form disclosed in U.S. patent application SN 798,043, filed March 9, 1959, by James O. Brown.

The integrator 45 is actuated from the impulses established by pilot valve 27 in pipes 30 and 34. In general, the integrator is actuated once each cycle, correcting the count of gross volumes of meter 6 to net volumes at a predetermined temperature, specific gravity, and other variables as desired.

ALTERNATE FORM OF RESERVOIR

The specific form of float chamber, or reservoir, disclosed in FIGS. 1 and 2 has several advantages. When the reservoir-chamber passes its dumped, and metered liquid into a depository, such tank can be made a part of the chamber walls. An entirely separate vessel need not be provided to function as does reservoir-chamber 18. The float, and its source-supplied transmitter, can be mounted in the surge tank wall. The dumped liquid conduit 28 from valve 17 can communicate, through the surge tank wall, with the chamber 18. The drain line 20 can then extend from the bottom of the float chamber, external of the surge tank and into the bottom of the surge tank. Drain valve 21 can then be accessible from outside surge tank 7.

Should an external tank, or vessel, be desired for a float chamber, FIG. 3 illustrates how the present invention may be embodied in such structure. Conduit 28 is shown, bringing metered and dumped, liquid from meter 6. Bottom valve 17 is shown in conduit 28, carrying out the same function it carried out in FIGS. 1 and 2.

Tank-vessel 50 is shown as a separate, independent, float chamber for bottom float 19. A conduit 51 removes the major portion of the dumped liquid from chamber 50 to a surge tank such as tank 7, or directly to the pipe line. Drain line 20 communicates the bottom of tank 50 with chamber 50 to perform the same function performed in FIGS. 1 and 2. Drain valve 21, in drain line 20, also functions as explained previously.

There must be included in chamber 50, to carry out the function of retaining liquid in buoying position beneath float 19, the equivalent of dam member 52. Dam 52 is an up-standing baffle in chamber 50 which captures a portion of the dumped liquid to buoy float 19 just as was done in reservoir 18. It is this pocket of retained liquid in chamber 50 which is drained through valve 21, and controlled thereby, to carry out the objects of the invention.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A metering system including,
a source of liquid to be metered,
a vessel connected to the source for receiving liquid from the source during a fill period,
a valve connected to the vessel bottom to pass liquid from the vessel during a dump period,
an open-topped reservoir mounted downstream of the bottom valve and arranged to receive the liquid dumped from the vessel through the valve and overflow a portion of the liquid received,
a float mounted in the reservoir and arranged to be buoyed by the liquid in the reservoir,
a drain conduit from the reservoir which is sized to empty the reservoir of liquid at a rate less than the rate at which the reservoir receives liquid from the vessel,
and a control system between the bottom valve and float for holding the bottom valve open so long as the float is buoyed in the reservoir, which because of the slower drainage from the reservoir will amount to so much time as to insure passage of sufficient clingage past the bottom valve which will maintain the metering accuracy of the system within predetermined limits of accuracy.

2. A metering system including,
a source of liquid to be metered,
a vessel connected to the source for receiving liquid from the source during a fill period,
a valve connected to the vessel bottom to pass liquid from the vessel during a dump period,
a chamber connected downstream of the valve to receive the liquid dumped from the vessel through the valve,
a dam-partition mounted within the chamber to define that portion of the chamber receiving the liquid,
a float mounted in that portion of the chamber receiving the liquid so as to be buoyed by the liquid received,
a discharge conduit connected to that portion of the chamber into which the liquid overflows the dam-partition and removing the liquid as rapidly as it overflows the dam-partition,
a drain conduit connected to the chamber portion in which the float is buoyed and sized to empty the liquid from beneath the float at a rate less than the rate at which the chamber receives liquid from the vessel,
and a control system between the bottom valve and float for holding the bottom valve open so long as the float is buoyed in the chamber portion, which because of the slower drainage from the chamber portion will amount to so much time as to insure passage of sufficient clingage past the bottom valve which will maintain the metering accuracy of the system within predetermined limits of accuracy.

3. A metering system including,
a source of liquid to be metered,
a vessel connected to the source for receiving liquid from the source during a fill period,
a valve connected to the vessel bottom to pass liquid from the vessel during a dump period,
a chamber connected downstream of the valve to receive the liquid dumped from the vessel through the valve,
a dam-partition mounted within the chamber to define that portion of the chamber receiving the liquid,
a float mounted in that portion of the chamber receiving the liquid so as to be buoyed by the liquid received,
a discharge conduit connected to that portion of the chamber into which the liquid overflows the dam-partition and removing the liquid as rapidly as it overflows the dam-partition,
a drain conduit connected to the chamber portion in which the float is buoyed to empty the liquid from beneath the float,
a valve in the drain conduit controlling the rate of liquid flow from beneath the float to a rate less than the rate at which the chamber receives liquid from the vessel,
and a control system between the bottom valve and float for holding the bottom valve open so long as the float is buoyed in the chamber portion, which because of the slower drainage from the chamber portion will amount to so much time as to insure passage of sufficient clingage past the bottom valve which will maintain the metering accuracy of the system within predetermined limits of accuracy.

4. A metering system including,
a source of liquid to be metered,
a vessel connected to the source for receiving liquid from the source during a fill period,
a valve connected to the vessel bottom to pass liquid from the vessel during a dump period,
a chamber connected downstream of the valve to receive the liquid dumped from the vessel through the valve,
a dam-partition mounted within the chamber to define that portion of the chamber receiving the liquid,
a float mounted in that portion of the chamber receiving the liquid so as to be buoyed by the liquid received,
a discharge conduit connected to that portion of the chamber into which the liquid overflows the dam-partition and removing the liquid as rapidly as it overflows the dam-partition,
a drain conduit connected to the chamber portion in which the float is buoyed to empty the liquid from beneath the float,
a valve in the drain conduit controlling the rate of liquid flow from beneath the float to a rate less than the rate at which the chamber receives liquid from the vessel,
a supply of control fluid pressure,
and a control system powered by the supply pressure and including the bottom valve and float and drain valve for holding the bottom valve open so long as the float is buoyed in the chamber portion, which because of the slower drainage from the chamber portion will amount to so much time as to insure passage of sufficient clingage past the bottom valve which will maintain the metering accuracy of the system within predetermined limits of accuracy and for closing the drain valve and the bottom valve at the same time when there is a supply failure during the dump period.

5. A metering system including,
a source of liquid to be metered,
a vessel connected to the source for receiving liquid from the source during a fill period,
a valve connected to the vessel bottom to pass liquid from the vessel during a dump period,
a chamber connected downstream of the valve to receive the liquid dumped from the vessel through the valve,
a dam-partition mounted within the chamber to define that portion of the chamber receiving the liquid,
a float mounted in that portion of the chamber receiving the liquid so as to be buoyed by the liquid received,
a discharge conduit connected to that portion of the chamber into which the liquid overflows the dam-partition and removing the liquid as rapidly as it overflows the dam-partition,
a drain conduit connected to the chamber portion in which the float is buoyed to empty the liquid from beneath the float,
a valve in the drain conduit controlling the rate of liquid flow from beneath the float to a rate less than the rate at which the chamber receives liquid from the vessel, an integrator for cumulating the fill-dump cycle completions as a measure of the total liquid delivered from the vessel, a supply of control fluid pressure, and a control system powered by the supply pressure and including the bottom valve and float and drain valve and integrator for, (a) the bottom valve to be held open so long as the float is buoyed in the chamber, which because of the slower drainage from the chamber will amount to so much time as to insure passage of sufficient clingage past the bottom valve which will maintain the metering accuracy of the system within predetermined limits of accuracy, (b) the drain valve and the bottom valve to be closed at the same time when there is supply failure during the dump period, (c) and the integrator to be actuated only when the float falls and the bottom valve closes, whereby only cycle completions are cumulated.

6. A metering system including, a source of liquid to be metered, a metering vessel, a topping valve connected to the metering vessel and adapted to be flooded by liquid from the source to be metered, detecting means for the flooding of the topping valve, a lower valve connected to the metering vessel and adapted to dump the metered liquid from the vessel, a storage vessel communicated to the lower valve downstream of the discharge valve, an open-topped reservoir formed in the storage vessel to receive the liquid from the lower valve and overflow into the storage vessel, a float mounted in the open-topped reservoir so as to be buoyed by the liquid received into the reservoir from the lower valve, a drain conduit connected to the reservoir to empty the liquid from beneath the float, a valve in the drain conduit controlling the rate of liquid flow from beneath the float to a rate less than the rate at which the reservoir receives liquid from the reservoir, and a control system between the bottom valve and float for holding the bottom valve open so long as the float is buoyed in the reservoir, which because of the slower drainage from the reservoir will amount to so much time as to insure passage of sufficient clingage past the bottom valve which will maintain the metering accuracy of the system within predetermined limits of accuracy.

7. A metering system including, a source of liquid to be metered, a metering vessel, a topping valve connected to the metering vessel and adapted to be flooded by liquid from the source to be metered, detecting means for the flooding of the topping valve, a lower valve connected to the metering vessel and adapted to dump the metered liquid from the vessel, a storage vessel communicated to the lower valve downstream of the discharge valve, an open-topped reservoir formed in the storage vessel to receive the liquid from the lower valve and overflow into the storage vessel, a float mounted in the open-topped reservoir so as to be buoyed by the liquid received into the reservoir from the lower valve, a drain conduit connected to the reservoir to empty the liquid from beneath the float, a valve in the drain conduit controlling the rate of liquid flow from beneath the float to a rate less than the rate at which the reservoir receives liquid from the reservoir, a supply of control fluid pressure, and a control system powered by the supply pressure and including the bottom valve and float and drain valve for holding the bottom valve open so long as the float is buoyed in the reservoir, which because of the slower drainage from the reservoir will amount to so much time as to insure passage of sufficient clingage past the bottom valve which will maintain the metering accuracy of the system within predetermined limits of accuracy and for closing the drain valve and the bottom valve at the same time when there is a supply failure during the dump period.

8. A metering system including, a source of liquid to be metered, a metering vessel, a topping valve connected to the metering vessel and adapted to be flooded by liquid from the source to be metered, detecting means for the flooding of the topping valve, a lower valve connected to the metering vessel and adapted to dump the metered liquid from the vessel, a storage vessel communicated to the lower valve downstream of the discharge valve, an open-topped reservoir formed in the storage vessel to receive the liquid from the lower valve and overflow into the storage vessel, a float mounted in the open-topped reservoir so as to be buoyed by the liquid received into the reservoir from the lower valve, a drain conduit connected to the reservoir to empty the liquid from beneath the float, a valve in the drain conduit controlling the rate of liquid flow from beneath the float to a rate less than the rate at which the reservoir receives liquid from the reservoir, an integrator for cumulating the fill-dump cycle completions as a measure of the total liquid delivered from the vessel, a supply of control fluid pressure, and a control system powered by the supply pressure and including the bottom valve and float and drain valve and integrator for, (a) the bottom valve to be held open so long as the float is buoyed in the reservoir, which because of the slower drainage from the reservoir will amount to so much time as to insure passage of sufficient clingage past the bottom valve which will maintain the metering accuracy of the system within predetermined limits of accuracy, (b) the drain valve and the bottom valve to be closed at the same time when there is supply failure during the dump period, (c) and the integrator to be actuated only when the float falls and the bottom valve closes, whereby only cycle completions are cumulated.

References Cited in the file of this patent

UNITED STATES PATENTS

| 2,773,556 | Meyer et al. | Dec. 11, 1956 |
| 2,831,350 | Banks et al. | Apr. 22, 1958 |
| 2,872,817 | Pitts | Feb. 10, 1959 |
| 2,977,796 | Pope | Apr. 4, 1961 |

OTHER REFERENCES

Shell's Proposal in an article entitled "Automatic Custody Transfer in Texas" in the Oil & Gas Journal, vol. 54, No. 48. July 30, 1956, pp. 122, 123. (Copy in Div. 36 (73/224).)

An article entitled "How Shell Designs an Automatic Lease" in the Oil & Gas Journal, Oct. 17, 1955, pp. 111–117. (Copy in Div. 36 (73/221).)